United States Patent [19]

Mitchell

[11] 4,306,635
[45] Dec. 22, 1981

[54] DISC BRAKE ASSEMBLY HAVING A DIAPHRAGM PRESSURE COMPENSATOR AND SEAL

[75] Inventor: Clarence I. Mitchell, Xenia, Ohio

[73] Assignee: General Motors Corporation, Detroit, Mich.

[21] Appl. No.: 103,193

[22] Filed: Dec. 13, 1979

[51] Int. Cl.³ .............................................. F16D 55/18
[52] U.S. Cl. .................................... 188/72.4; 188/370
[58] Field of Search ..................... 188/71.1, 71.9, 370, 188/72.4, 72.5; 92/1.75, 63, 64

[56] References Cited

U.S. PATENT DOCUMENTS

| 3,502,004 | 3/1970 | Schrader | 92/129 |
| 3,920,103 | 11/1975 | Haraikawa | 188/71.9 |
| 3,991,859 | 11/1976 | Coulter et al. | 188/71.9 |
| 4,181,145 | 1/1980 | Mitchell | 188/71.1 X |

FOREIGN PATENT DOCUMENTS 52-63560  5/1977  Japan .................... 188/71.9

*Primary Examiner*—Ralph J. Hill
*Attorney, Agent, or Firm*—D. D. McGraw

[57] ABSTRACT

A self-adjusting rear disc brake assembly provided with a parking brake to mechanically actuate the disc brake, as well as having hydraulic service brake actuation, has a confined air space between the outer piston and the inner piston. The pressure compensator and seal embodying the invention operates to maintain the confined air space substantially at ambient air pressure while preventing contamination of the brake actuating mechanism by air borne contaminants normally encountered in the area of a vehicle rear brake mechanism.

2 Claims, 4 Drawing Figures

DISC BRAKE ASSEMBLY HAVING A DIAPHRAGM PRESSURE COMPENSATOR AND SEAL

The invention relates to a diaphragm pressure compensator and seal which equalizes air pressure in a confined air space in a disc brake caliper assmebly with ambient air pressure, and prevents foreign contaminant material from having any substantial access to the air space. The diaphragm is made of a flexible rubber-like material such as silicone rubber.

The disc brake caliper assembly in which the device is preferably used has an outer piston and an inner piston defining therebetween a confined air space. A clutch mechanism is formed on mating surfaces of the pistons for adjustment and parking brake actuation of the caliper assembly. A brake of this type is disclosed in detail in U.S. Pat. No. 3,770,082, issued Nov. 6, 1973. As the brakes are operated, the confined air space will be subjected to changes in temperature in a cyclical manner, with consequent changes in air pressure in the confined air space. In some constructions a vent has been provided for this space so that such changes in pressure do not have any effect on the operation of the caliper assembly. Such an arrangement is disclosed and claimed in U.S. patent application Ser. No. 904,317, filed by me on May 10, 1978, and entitled "Two-Way Check Valve".

One or more vent passages have been previously provided in the face of the outer piston. However, such open passages allow foreign contaminant material to enter the confined air space and contaminate the clutch faces as well as the seal between the pistons. A rubber-like check valve has also been used in production, such a check valve being placed in an opening in the face of the outer piston and permitting ambient air to enter the confined air space as the air space cools through the provision of a single duckbill check valve. The valve assembly was so arranged that air from the confined air space could be exhausted through the opening between the opening wall and the valve assembly. Therefore the valve assembly was fitted somewhat loosely in the opening or provided with a passageway which was somewhat protected by one of the mounting flanges of the valve assembly. However, a better protective device has been found to be desirable since some foreign contaminant materials could still enter the confined air space around the valve body.

The valve assembly of the above identified application has a pair of normally closed duckbill check valves formed therein. Each of the valves open and close in axially opposite directions relative to the other so that only one of the pair of valves will open to exhaust air from the air space to ambient air when the pressure in the confined air space increases to a predetermined pressure level above ambient air pressure sufficient to open that one check valve. Only the other of the pair of check valves will open to admit ambient air into the air space when the pressure in the air space decreases to a predetermined pressure level below ambient air pressure. The check valve therefore prevents the pressure from reaching a pressure level in either direction which is undesirable.

The construction embodying the invention uses a flexible diaphragm so constructed and arranged that it can move in response to a slight pressure differential acting across it in either direction to increase or decrease the volume of the air space and thereby compensate for pressure changes. This is advantageous compared to arrangements provided with direct, open vents or with one or more valves since the diaphragm maintains a complete seal at all times. No dirt can lodge in a valve and render the valve less effective. The diaphragm is easier to mold than are many valves. When the brakes have been actuated and the air in the confined air space heated, the pressure therein increases above ambient air pressure and the diaphragm moves outwardly. Later, when the brake cools, the pressure in the confined air space decreases and falls below ambient air pressure. The diaphragm then moves inwardly. At all times only a slight pressure differential is sufficient to cause compensating movement of the diaphragm. Thus a higher pressure will not be forced past the inner piston seal into the hydraulic portion of the brake, nor will a lower pressure tend to hold the inner piston more tightly into engagement through the clutch surfaces with the outer piston even though the brake is released. At the same time, the diaphragm provides a complete seal against the entrance of foreign contaminant material.

IN THE DRAWING

Figure 1:
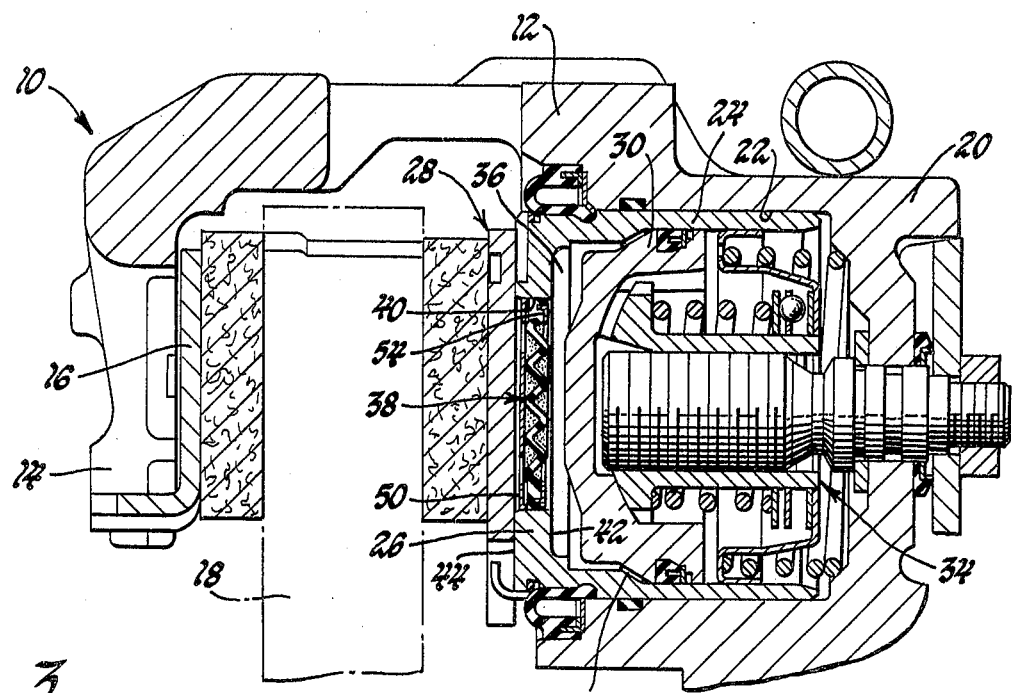
FIG. 1 is a cross section view of a disc brake caliper assembly having a diaphragm and seal assembly embodying the invention.

The disc brake assembly 10 of FIG. 1 is similar to that disclosed and claimed in U.S. Pat. No. 3,770,082 referred to above. It has a caliper housing 12 with one leg 14 having a brake shoe assembly 16 mounted thereon for braking engagement with one side of the disc 18. The other caliper leg 20 has a cylinder 22 formed therein. An outer piston 24 is reciprocably and sealingly mounted in cylinder 22. A piston face wall 26 receives another shoe assembly 28 which is arranged for braking engagement with the other side of disc 18. An inner piston 30 is reciprocably and sealingly mounted within outer piston 24. Clutch surfaces on mounting portions of pistons 24 and 30 define a clutch 32. A brake adjusting and parking brake actuating mechanism 34, which may be of the type which is the subject of the above noted U.S. Pat. No. 3,770,082, is contained within cylinder 22. A part of mechanism 34 extends outwardly of the cylinder so as to be mechanically actuated. A confined air space 36 is formed between pistons 24 and 30. The confined air space 36 is subject to cyclical heating or cooling and therefore changes in air pressure in the space. The diaphragm and seal assembly 38 embodying the invention allows the confined air space 36 to expand in volume upon a pressure increase relative to ambient air pressure, or to decrease in volume when the pressure in the confined air space decreases below ambient air pressure. The diaphragm and seal assembly is mounted in an opening 40 formed in the face wall 26 of piston 24, the opening communicating confined air space 36 with ambient air before assembly 38 is installed.

Figure 2:
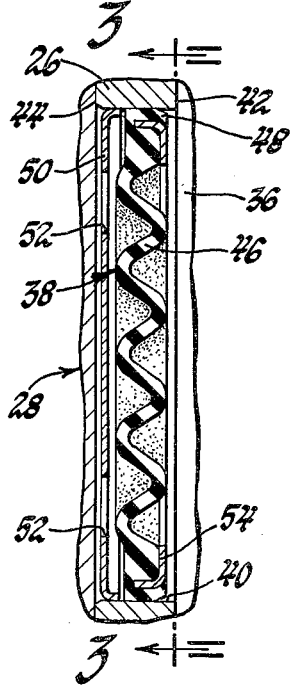
FIG. 2 is a cross section view of the diaphragm and seal assembly of FIG. 1.
Figure 3:
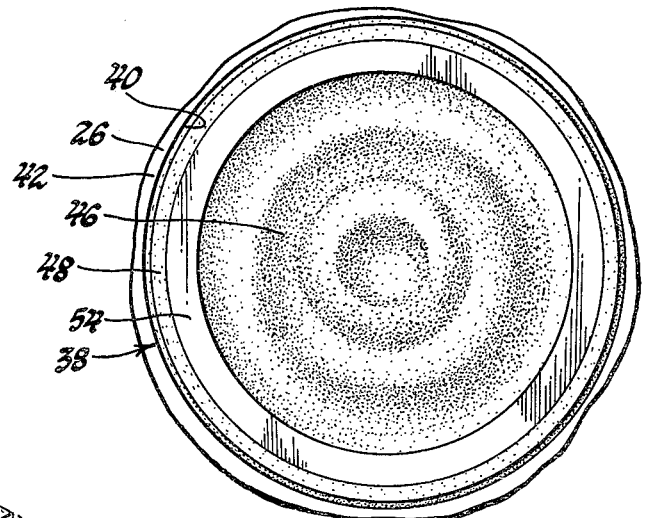
FIG. 3 is a view of the diaphragm and seal assembly taken in the direction of arrows 3—3 of FIG. 2 and having parts broken away.
Figure 4:
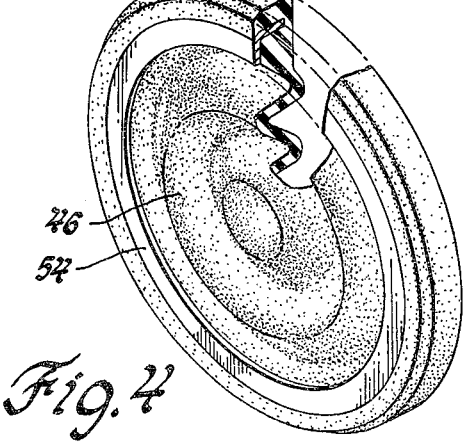
FIG. 4 is a perspective view of the diaphragm and seal assembly.

The assembly embodying the invention is illustrated in greater detail in FIGS. 2 through 4. The piston face wall 26 has an inner wall 42 forming a wall of the confined air space 36, and an outer wall 44 connected with ambient air. The assembly 38 has a flexible body section 46 and an outer mounting and sealing flange 48 fits in a sealing manner against the wall defining opening 40 in piston wall 26. The assembly body section 46 is imperforate and is preferably formed in a convoluted manner to permit relatively easy axial movements without straining the material of the body or exerting any meaningful force on flange 48 tending to move the assembly 38 axially in opening 40. The entire assembly 38 is held within opening 40 axially between the planes of inner wall 42 and outer wall 44. A retainer 50 holds assembly 38 in opening 40. The retainer has vent openings 52 which assure the presence of ambient air on the outer side of assembly 38, and yet acts as a limiting surface engageable by the convoluted body section 46 when assembly 38 expands outwardly to a sufficient extent. The assembly 38 will therefore not contact shoe 28, which may be quite hot at times. Flange 48 fits tightly in opening 40 and the opening is therefore so sealed that no air or foreign contaminant material will pass between the assembly 38 and the surface defining the opening 40 of piston wall 6, either to or from the confined air space 36. The flange 48 has an annular stiffening member 54 molded therein to assist in holding the assembly in place.

The diaphragm formed by body section 46 is flexible so that it expands in one axial direction as air in the trapped air chamber 36 is heated by brake actuation, limiting the air pressure increase in chamber 36 to a nominal value. It contracts and, as necessary, expands in the other axial direction as air in chamber 36 cools, allowing the air volume in chamber 36 to decrease while remaining substantially at atmospheric pressure and operating to limit any potential subatmospheric air pressure in chamber 36 to a nominal value. The assembly 38 seals opening 40 against the flow of air between chamber 38 and atmosphere and prevents the entry of foreign matter such as dirt and dust into chamber 36 through opening 40.

The embodiments of the invention in which an exclusive property or privilege is claimed are defined as follows:

1. In a disc brake actuator having an outer piston with one end acting on a brake shoe for brake actuation and an inner piston movable within said outer piston, said inner and outer pistons defining therebetween a trapped air chamber, and an opening formed axially through said outer piston one end and connecting said trapped air chamber to atmosphere, the improvement comprising:

a flexible axially expandable and contractable imperforate diaphragm secured in said opening within said outer piston one end and in sealing relation with said outer piston, said diaphragm expanding in one axial direction as air in said trapped air chamber is heated by brake actuation to limit the air pressure increase in said trapped air chamber to a nominal value, said diaphragm contracting and as necessary expanding in the other axial direction as air in said trapped air chamber cools to allow the air volume in said trapped air chamber to decrease while remaining substantially at atmospheric pressure and operating to limit any potential subatmospheric air pressure in said trapped air chamber to a nominal value, said diaphragm sealing said opening against the flow of air between said trapped air chamber and atmosphere and preventing the entry of foreign matter such as dirt and dust into said trapped air chamber through said opening.

2. In a disc brake actuator hving an outer piston with one end acting on a brake shoe for brake actuation and an inner piston movable within said outer piston, said inner and outer pistons defining therebetween a trapped air chamber, and an opening formed axially through said outer piston one end and connecting said trapped air chamber to atmosphere, the improvement comprising:

a flexible axially expandable and contractable imperforate diaphragm secured in said opening in sealing relation with said outer piston, said diaphragm expanding in one axial direction as air in said trapped air chamber is heated by brake actuation to limit the air pressure increase in said trapped air chamber to a nominal value, said diaphragm contracting and as necessary expanding in the other axial direction as air in said trapped air chamber cools to allow the air volume in said trapped air chamber to decrease while remaining substantially at atmospheric pressure and operating to limit any potential subatmospheric air pressure in said trapped air chamber to a nominal value, said diaphragm sealing said opening against the flow of air between said trapped air chamber and atmosphere and preventing the entry of foreign matter such as dirt and dust into said trapped air chamber through said opening;

and a perforated diaphragm retainer secured in said opening between said outer piston one end and said brake shoe, said retainer acting to prevent said diaphragm from moving out of said opening toward said brake shoe and preventing engagement of said diaphragm with said brake shoe when said diaphragm expands in said one axial direction.

* * * * *